United States Patent [19]

Melander et al.

[11] E Re. 30,149

[45] Reissued Nov. 13, 1979

[54] PREPARATION OF ANTIFIBRINOLYTICALLY ACTIVE ISOMER OF 4-AMINOMETHYLCYCLOHEXANE CARBOXYLIC ACID

[75] Inventors: Bengt O. Melander; Gunnar Hanshoff, both of Stockholm; Bengt R. G. Granstrand, Vallentuna; Berit M. Olsson, Trangsund, all of Sweden

[73] Assignee: AB Kabi, Stockholm, Sweden

[21] Appl. No.: 7,717

[22] Filed: Jan. 30, 1979

Related U.S. Patent Documents

Reissue of:

[64] Patent No.: 3,574,721
Issued: Apr. 13, 1971
Appl. No.: 417,235
Filed: Dec. 9, 1964

[30] Foreign Application Priority Data

Dec. 17, 1963 [SE] Sweden ..... 14085/63

[51] Int. Cl.[2] ..... C07C 101/04
[52] U.S. Cl. ..... 562/507
[58] Field of Search ..... 562/507

[56] References Cited

FOREIGN PATENT DOCUMENTS 690537 7/1964 Canada ..... 260/514

OTHER PUBLICATIONS

Liebeg's Annalen der Chemie, vol. 310, p. 194 (1900).
Deruent Abstract of Belgium Pat. 617,216, Feb. 1, 1963.
Notler: Chemistry of Organic Compounds, 2nd ed.

*Primary Examiner*—Paul J. Killos
*Attorney, Agent, or Firm*—A. A. Orlinger

[57] ABSTRACT

Disclosed and claimed is the preparation of the 4-aminomethyl-cyclohexane carboxylic acid isomer assaying at least about 90% antifibrinolytically active material from specific para-disubstituted cyclohexane starting material. For example, in 4-aminomethyl-cyclohexane methanol such as its isomer melting at 118° C. in a series of steps its methanol group is converted to carboxyl. More specifically its amino group is blocked by reaction with benzoyl halide and the methanol group then oxidized to carboxyl, and the benzoyl group removed to yield the end product isomer.

1-4-dimethyl-cyclohexane dicarboxylate melting at 69°-71° C., another such cyclohexane starting material, is hydrolyzed to its mono-ester which with thionyl halide is converted to the halide of the half-ester, which latter reacted with ammonia gives the corresponding ester amide. The latter is heated with thionyl halide and converted to methyl 4-cyano-cyclohexane carboxylate which then is hydrolyzed to yield 4-cyano-cyclohexane carboxylic acid which catalytically reduced using a compatible reduction catalyst such as Raney nickel is converted to the 4-aminomethyl-cyclohexane carboxylic acid end product.

4 Claims, No Drawings

PREPARATION OF ANTIFIBRINOLYTICALLY ACTIVE ISOMER OF 4-AMINOMETHYLCYCLOHEXANE CARBOXYLIC ACID

Matter enclosed in heavy brackets [ ] appears in the original patent but forms no part of this reissue specification; matter printed in italics indicates the additions made by reissue.

This invention is that of the antifibrinolytically active isomer of 4-aminomethyl-cyclohexane carboxylic acid (which as the isomeric mixture has been abbreviated to AMCHA). The thus active isomer of AMCHA hereinafter conveniently is variously briefly called "active-AMCHA" or "active-AMCHA isomer" or the "antifibrinolytic active-AMCHA isomer."

The invention includes the method of preparation of active-AMCHA isomer from 1,4-disubstituted cyclohexane starting substances wherein one of these substituents can be converted to the carboxylic acid group, and the other one can be converted to the aminomethyl group.

Also part of the invention is the method of converting the inactive isomer of AMCHA, whether the starting material is (a) AMCHA synthesized, for example, by hydrogenation or by catalytic reduction and hydrogenation from 4-aminomethyl- or 4-cyano-benzoic acid, by far the major part of which AMCHA has been found herein to be the inactive isomer, or is (b) the inactive isomer when otherwise obtained, into the active-AMCHA.

A further part of the invention is that of pharmaceutical preparations wherein the only or principal therapeutically effective agent consists essentially of the active-AMCHA isomer, such preparations then having the property of being surprisingly more effective in treating an ailment due to increased fibrinolysis than preparations heretofore used against such ailments.

Yet another part of the invention is the method of combating (i.e. curtailing or overcoming) an ailment due to increased fibrinolysis by administering to a subject suffering from the ailment the antifibrinolytically active-AMCHA isomer in an antifibrinolytically effective dose at a suitable dosage regimen adequately to subdue the increased fibrinolysis.

Increased fibrinolysis may appear during menstruation and also in certain diseases following surgical operations. Because of the serious character which bleeding disorders of this type may show, the provision in the drug armamentarium of products having an antifibrinolytic activity has been gratefully acknowledged. The first low-molecular synthetic drug found to possess such activity is the nonessential amino acid, epsilon-aminocaproic acid (as described in U.S. Pat. 2,939,817), to which was given the convenient abbreviation EACA.

The antifibrinolytic activity of EACA has been evaluated in in vitro tests as well as in in vivo tests on laboratory animals. By using streptokinase it is possible to produce in laboratory experiments an induced, increased fibrinolytic activity. By means of titrations and determination of periods of fibrinolysis following addition of varying amounts of streptokinase and EACA to the test systems, the antifibrinolytic activity of EACA can be satisfactorily evaluated and correlated with the effect in clinical use in patients. Thus, a satisfactory parallel exists for it between the values obtained in the various types of laboratory experiments and under clinical conditions.

The scientific evaluation of EACA has demonstrated that preparations comprising it manifest an acceptable degree of antifibrinolytic activity in clinical use. However, EACA is so rapidly excreted by the animal organism, i.e. the subject being treated, that in order to maintain the desired antifibrinolytic effect under clinical conditions, it has been seen to be necessary to administer amounts of 25 grams or more per 24 hours despite its indicated relative antifibrinolytic activity.

Subsequent investigations resulting in British patent specification 949,512 reveal an antifibrinolytic activity in 4-aminomethyl-cyclo-hexane carboxylic acid (AMCHA). Data presented in that British patent specification and a series of reports published by Okamoto, S. et al., namely: (i) "A New Potent Antifibrinolytic Substance and its Effects on Blood of Animals," XXII Intern. Congr. Physiol. Sci., Leiden, Sept. 10–17, 1962, Abstract, (ii) "AMCHA, A New Potent Inhibitor of the Fibrinolysis," Keio J. Med. 11 (1962) No. 3, p. 105, and (iii) "Influence of AMCHA on the Activity of Fibrinolysin (Plasmin)," Ibid p. 117, indicate that (a) AMCHA is more active than EACA on a weight for weight basis, and (b) the antifibrinolytic activity of AMCHA is of the order of twice that of EACA.

However, the acute intravenous toxicity in mice and rats, expressed as lethal dose for 50% of the experimental animals ($LD_{50}$), indicates that AMCHA is two times more toxic than EACA. Thus, there is no obvious clinical advantage in using AMCHA instead of EACA.

The work with AMCHA, which resulted in the present invention, made it possible as a part of it to identify, and to assay the relative amounts of, two isomers in the substance referred to as AMCHA in the above-noted studies of Okamoto et al. Thus, the substance which they used and called AMCHA is a mixture of isomers. It is another part of the present invention that the whole antifibrinolytic activity of the hitherto studied AMCHA is provided by one of these herein found isomers of AMCHA, namely, the one which is referred to at the beginning of this specification as the antifibrinolytically active isomer of AMCHA, and also briefly as active-AMCHA. This active isomer constitutes about 10 to about 25% of the isomeric mixture, i.e. AMCHA, which is obtained by hitherto employed synthetic procedures, e.g. catalytic hydrogenation of the benzene group as in 4-aminomethyl-benzoic acid or reduction and hydrogenation of 4-cyanobenzoic acid, such as are indicated in the British patent specification 949,512.

Evaluation of the antifibrinolytic activity of the two separate AMCHA isomers by the technique described further below shows the active-AMCHA isomer to be twenty times more potent than EACA whereas the other or inactive AMCHA isomer is practically devoid of any antifibrinolytic activity. Clinical use of compositions comprising a high relative amount of the active-AMCHA isomer thus provide a worthy advantage. This is especially so as there is no significant difference in acute toxicity in terms of $LD_{50}$-values between the isomeric mixture AMCHA containing 10 to 25% of the active isomer and the active-AMCHA isomer iself.

A significant feature of this invention then is the provision of methods whose steps yield compositions, by far the greater portion of which is the active-AMCHA isomer, whereby they manifest unusually high, specific antifibrinolytic activity.

The various aspects and parts of the invention are illustrated, but not to be limited, by the various different types of examples which follow.

Separation, identification and quantitative determination of the active-AMCHA and the inactive isomer respectively of the isomeric AMCHA mixture, and from any other amino acids which the test solution sample might contain, was carried out by paper electrophoresis by following a technique which is chiefly that of Atfield, G. N. and Morris, C. J. O. R. in Biochem. Jour., volume 81 (1961), page 606.

The electrophoretic separation was carried out by use of a high voltage electrophoresis apparatus equipped with a cooling plate of glass, cooled by tap water with a temperature of from +2° to +13° C. The solution to be subjected to the electrophoresis were applied on chromatography paper of the type Munktell 302 M.

The active-AMCHA isomer was separated from other possible amino acids in the test sample solution by paper electrophoresis at pH 4.5. In the work resulting in this invention, it was found that at this pH, AMCHA moves towards the cathode and is thoroughly separated from all available natural amino acids. After the electrophoretic separation, the quantity of AMCHA present was developed by treating it with ninhydrin reagent, the resulting color complex being extracted with methanol solvent, and the amount of AMCHA was determined spectrophotometrically by comparison against a set of AMCHA standards.

It also was found that the distances covered by various amino acids at pH 4.5; at tension reduction 50 v./cm.: in 200 minutes at the temperature of +6° C., was respectively:

| | Millimeters |
|---|---|
| Alanine | 25 |
| Active-AMCHA isomer | 135 |
| EACA | 150 |
| Inactive AMCHA isomer | 160 |
| Lysine | 240 |

The buffer for pH 4.5 was made up of 40 ml. acetic acid, 40 ml. pyridine, 150 ml. acetone, and diluted with distilled water to 1000 ml.

Thus, the active-AMCHA isomer moves a distance of 135 millimeters in 200 minutes in a high voltage electrophoresis system using chromatograph paper in an aqueous system buffered at about pH 4.5 by an acetate pyridine buffer and operated at voltage reduction 50 v./cm. and ampere reduction 5 ma./cm., as compared with movement by alanine of about 25 millimeters under identical conditions.

The ninhydrin reagent was that described by Heilman, J., Barollier, J., and Watzke, E. in Hoppe-Seyl Zeitschrift, volume 309 (1957), page 219, as made up of 0.050 gram cadmium acetate dissolved in a mixture of 5.0 ml. distilled water and 1.0 ml. acetic acid; 50 ml. acetone was added, and the mixture was shaken until the precipitate was dissolved. To this mixture 0.50 gram ninhydrin was added and dissolved. This reagent was intended for one day use only.

The methanol to dissolve the colored spots is re-distilled or of analytical quality.

Standard solutions were prepared for comparisons, comprising pure active-AMCHA isomer dissolved in water at the following concentrations; 20; 10; 5; and 2.5 mg./ml. respectively. These amounts correspond to 120, 60, 30, and 15 gamma (i.e. $\gamma$) of pure AMCHA isomer, e.g. isolated by electrophoresis from isomeric AMCHA mixture.

Analytical procedure: 6 microliters (i.e., $\mu$l.) of these respective standard solutions were applied on respectively separate areas on the chromatography paper. The unknown test solution also was applied on the paper. The chromatograph paper then was moistened by spraying on the buffer solution, was placed on the cooling plate of the apparatus, and the electrophoresis carried out as described above. The chromatography paper then was dried for 2 hours by cool air, dipped into the ninhydrin reagent and re-dried. The paper then was kept in the dark in an air-tight container, above a quantity of concentrated sulphuric acid used to keep the atmosphere free of ammonia.

After 20 hours, the colored spots were removed together with a corresponding amount of the non-colored part of the paper, and extracted with the methanol. Each of the red solutions was filtered, and its extinction at 500 millicrons (i.e. m$\mu$) was measured against that of the control sample.

The figures obtained were utilized for determination of the amount of active-AMCHA isomer present in the sample. Content of the inactive isomer was and can be assayed by the same procedure.

Active-AMCHA crystal properties: The foregoing analytical procedures together with data from infrared spectroscopy, nuclear magnetic resonance studies, and X-ray crystallography indicate that the active-AMCHA isomer appears in its crystals as an inner salt (i.e. Zwitterion) and as having the crystal axis a=6.29, b=7.90, and c=16.66.

Antifibrinolytic activity quantitative assay was conducted by a technique utilizing the procedures described by Christensen, L. E. in J. clin. Invest., volume 28 (1949), page 163, and Wasserman, A. E., et al. in J. Lab. clin. Med., volume 4 (1953), page 812. This technique involves measuring the amount of active-AMCHA isomer necessary for producing 50% inhibition of streptokinase-induced fibrinolysis in vitro. The system consists of fibrinogen, plasminogen, and thrombin, to which is added 6 units of streptokinase which produces a lytic effect. The 50% inhibition studied corresponds to a lytic activity of 3 units of streptokinase. In principle, streptokinase activates the pro-enzyme plasminogen to plasmin, which latter enzyme possesses fibrinolytic activity. The time necessary for the formed plasmin to dissolve a standard fibrin coagulum is determined.

The following table furnishes the data on the in vitro antifibrinolytic activity of the several compounds considered in this specification, expressed as 50% inhibition of 6 units of streptokinase:

| Compound | Relative activity | Actual amount of compound |
|---|---|---|
| EACA | 1 | 4$\gamma$ |
| Isomeric AMCHA, comprising 10% active isomer | 2 | 2$\gamma$ |
| Active-AMCHA isomer | 20 | 0.2$\gamma$ |
| Inactive-AMCHA isomer | 0.1 | 30$\gamma$ |

The presently more advantageous synthetic route resulting in a high yield of the active-AMCHA isomer is that of using as the starting material a 1,4-disubstituted cyclohexane wherein one of these substituents is the aminomethyl group or a group which can be converted to it and the other of them is a group which can be converted through a series of reaction steps that can convert it to the carboxyl group and separating the resulting 4-aminomethylcyclohexane carboxylic acid antifibrinolytically active isomer. Such procedures are shown, but not to be restricted, by Example 1 and 2.

EXAMPLE 1

Active-AMCHA from dimethyl-cyclohexane dicarboxylate 800 grams of the isomer of 1,4-dimethyl-cyclohexane dicarboxylate, having the melting point (i.e. M.P.) 69°-71° C., are dissolved in 2 liters of methanol, 255 grams of potassium hydroxide dissolved in 175 milliliters (i.e. ml.) of water are added thereto slowly, while cooling the resulting mixture. The reaction mixture thereafter is heated and refluxed for 30 minutes, and followed by cooling and neutralization with concentrated hydrochloric acid. The precipitated mono-ester is isolated by filtration and washed with aqueous methanol. Its M.P. is 124°-125° C. and yield 93%.

310 grams of this intermediate half ester are mixed with 295 grams of thionyl chloride at room temperature and heated on a steam-bath for one hour. Unreacted thionyl chloride is evaporated off under vacuum, and the residue distilled at 138°-141° C. Yield of cyclohexane methyl-half-ester acid chloride is 79%.

200 grams of this latter intermediate cyclohexane-half-ester acid chloride are added drop-wise to 2 liters of concentrated ammonia at a temperature below 10° C. After standing overnight in the cold, the precipitated corresponding ester amide is isolated by filtration, washed and dried. M.P. 189°-190° C. Yield 80%.

125 grams of this intermediate ester amide are refluxed for 5 hours together with 400 grams of thionyl chloride and 200 ml. of benzene. The reaction mixture is filtered and the filtrate concentrated by evaporating off the solvent. The residue is distilled giving a 70% yield of methyl 4-cyano-cyclohexane carboxylate boiling at 148°-156° C. at 14 millimeters of mercury.

71 grams of this 4-cyano-cyclohexane carboxylic acid methyl ester are dissolved in 200 ml. of methanol and treated with 27.1 grams of potassium hydroxide in 50 ml. of water, to hydrolyze the ester. The resulting 4-cyanocyclohexane carboxylic acid has a M.P. 151°-152° C. Yield 85%.

14 grams of the free 4-cyano-cyclohexane carboxylic acid, admixed in 40 ml. of concentrated ammonia and 150 ml. of water, are reduced catalytically in presence of 2 grams of Raney nickel at a pressure of 1 atmosphere and a temperature of 25° C. for 6 hours. After filtration of the reaction mixture, the filtrate solution is evaporated under vacuum, and re-crystallized from aqueous acetone. 95% yield of active-AMCHA isomer.

The active-AMCHA isomer obtained by this route assays 95% or better and can be used without further purification.

The reduction of the foregoing free 4-cyano-cyclohexane carboxylic acid can be conducted by dissolving it in sufficient of a water-soluble alkaline agent suitable for use in catalytic reduction, and feeding in hydrogen gas in the presence of a sufficient quantity of a compatible reduction catalyst which, as in the foregoing paragraph, advantageously is Raney nickel, and until the desired reduction is substantially complete.

EXAMPLE 2

Active-AMCHA from aminomethyl cyclohexane methanol

To a cold reaction mixture of 143 grams of 4-aminomethyl cyclohexane methanol of M.P. 118° C., and 270 grams of sodium carbonate in 3.5 liters of toluene, are added drop-wise 140.5 grams of benzoyl chloride in 100 ml. of benzene, while cooling. During 5 hours the reaction temperature is allowed to return to room temperature, followed by refluxing for 4 hours, and filtration. Yield of 4-benzoylaminomethyl cyclohexane methanol is 70%.

170 grams of 4-benzoylaminomethyl cyclohexane methanol, 2000 ml. of water, and 7 grams of sodium hydroxide form a reaction mixture to which 109 grams of potassium permanganate are added during 1.5 hours at a temperature below 40° C. The reaction mixture is agitated overnight at a room temperature, and filtered. The filtrate is acidified by hydrochloric acid and cooled. The oily layer is separated. Yield of 4-benzoylaminomethyl cyclohexane carboxylic acid is 60%.

81 grams of this intermediate 4-benzoylaminomethyl cyclohexane carboxylic acid and 700 ml. of 18% hydrochloric acid are refluxed for 16 hours. The mixture is evaporated to 25% of the original volume and filtered. The filtrate is evaporated to dryness. Yield of 4-aminomethyl cyclohexane carboxylic acid is 98%.

49 grams of this 4-aminomethyl cyclohexane carboxylic acid are dissolved in 500 ml. of distilled water and adsorbed in 500 ml. of chromatography resin (Amberlite IR 4 B-H-form, product of Rohm and Haas, Philadelphia, Pa.), and eluted by 2 liters of distilled water. After evaporation to 100 ml., 500 ml. of acetone are added, and the precipitated 4-aminomethyl cyclohexane carboxylic acid active isomer is isolated by filration, to a yield of 75%.

The active-AMCHA isomer thus obtained assays 90% or better, and can be used as such or after a second recrystallization from aqueous acetone, which yields its product assaying 95% or better as to the active-AMCHA isomer.

The foregoing Example 2 illustrates the synthetic route resulting in a high yield of the active-AMCHA isomer by using as the starting material a 1,4-di-substituted cyclohexane where one of these substituents is the aminomethyl group and the other para to it is the methanol group (which group can be converted to the carboxyl group).

In conducting the steps of that Example 2 starting with the 4-aminomethyl cyclohexane methanol with the melting point at 188° C., that di-substituted cyclohexane, dissolved in an inert solvent for it and with adding to that cold solution sufficient alkali metal carbonate to neutralize later formed hydrogen halide, is reacted with sufficient benzoyl halide (dissolved in a suitable inert solvent advantageously miscible with the first solvent) and cautiously while cooling the reaction mixture to avoid undesirable temperature rise, to form the corresponding 4-benzoylaminomethyl derivative.

The resulting reaction mixture then is heated, even at reflux, for a time sufficient for substantially complete formation of that benzoyl-derivative. Any insoluble material then is removed from the reaction solution and the solvents are distilled off, and from the residue is recovered the resulting 4-benzoylaminomethylcyclohexane methanol.

The latter then is admixed with water and sufficient alkali metal hydroxide to provide oxidation conditions, and a compatible oxidation agent is added to the mixture in an amount sufficient to oxidize the methanol group to the carboxylic acid group while controlling the temperature advantageously below 40° C. until addition of that agent is completed and then beneficially with agitating until substantial completion of the oxidation. Any insoluble material then is removed from the reaction mixture and it is acidified with mineral acid and cooled.

The separated oily layer of 4-benzoylaminomethyl cyclohexane carboxylic acid is removed from the reaction mixture and heated, even at reflux, with sufficient mineral acid and for a sufficient time to split off the benzoyl group. The resulting mixture then is concentrated in about the original volume of that oily layer of the benzoyl-intermediate and any insoluble material is removed from it. The filrate is evaporated to dryness and the dry material dissolved in distilled water and passed through a bed of chromatography resin. The filtrate from it is evaporated to about concentrated state, and sufficient acetone is added to precipitate the desired antifibrinolylically active 4-aminomethylcyclohexane carboxylic acid isomer.

When the synthetic procedure for synthesizing AMCHA comprises catalytic hydrogenation of 4-aminomethyl benzoic acid, or a benzoic acid substituted in position 4 with a group, convertible to the aminomethyl group, for example, the reduction of 4-cyanobenzoic acid, or other similar route resulting in a mixture of the active and predominately the inactive AMCHA isomer, the inactive isomer can be converted practically completely into active-AMCHA isomer by subjecting the isomeric AMCHA mixture or the isolated inactive form, to treatment with an alkali metal which can form a salt with AMCHA. Such reaction preferably is carried out in a reaction medium wherein the alkali metal salt of AMCHA is soluble. This involves also isolation of the free acid which primarily comprises active-AMCHA, and purification.

In place of the alkali metals themselves, there can be used a corresponding alkali metal hydride, hydroxide, amide, methoxide, and other alkali metal alcoholate. The reaction medium can be melted AMCHA itself, or an inert organic solvent such as an aliphatic alcohol, preferably a high boiling alcohol or glycol, or glycol ester, or dimethyl sulfoxide, as well as an inert aromatic solvent as benzene or its alkyl-substituted derivatives like toluene or xylene. An advantageous method for purification involves, for example, cation exchange chromatography.

Such a method for converting the inactive AMCHA isomer into active-AMCHA is demonstrated, but not restricted to, the following:

EXAMPLE 3

Converting inactive AMCHA to active-AMCHA by sodium amylate 157 grams of AMCHA obtained by hydrogenation of 4-aminomethyl benzoic acid, and comprising about 10% of the active-AMCHA isomer, are added to 2 liters of sodium amylate prepared from 92 grams of sodium and 2 liters of amyl alcohol (technical grade) of B.P. 130°-132° C.

The reaction mixture is refluxed for 48 hours, and the excess alcohol then evaporated. The residue is dissolved in 2 liters of water and passed over a cation exchange resin (Amberlite IRC-50, a Rohm and Haas product). The eluate is evaporated to a small volume (e.g. 200 ml. or somewhat more) and the dissolved AMCHA is precipitated from the hot solution by admixing acetone. Yield of active-AMCHA product is 95 grams.

Additional quantities of active-AMCHA can be recovered from the filtrate by further evaporation and acetone precipitation. The product obtained assays 95% or better with regard to the antifibrinolytically active-AMCHA isomer, and is suitable for the production of pharmaceutical preparations for clinical use without further enrichment.

The procedure of Example 3 can be repeated with some other alkali metal amylate or alcoholate. Similarly, the conversion can be carried out by using an alkali metal, or an alkali metal compound of the type described above, and in any of the above-described inert solvent vehicles.

Separation of the active-AMCHA and inactive isomer from the isomeric AMCHA mixture and quantitative determination of their content, as well as quantitative assay of antifibrinolytic activity, are carried out by the methods described above.

Pharmaceutical preparations comprising adequately effective dosage quantities of the antifibrinolytically active-AMCHA can be prepared in any of the necessary dosage forms in compatible carriers, as illustrated by, but not limited to, the following examples:

EXAMPLE 4

Parenteral solution

A solution for injection is prepared from 100 grams of antifibrinolytically active-AMCHA isomer (assaying 95% active material) and sterile water for injection to make 1000 ml. The aqueous solution is passed through a sintered glass filter and divided into vials of 10 ml. each containing one gram of the active-AMCHA. The subdivided material is autoclaved at 120° C. for 30 minutes.

EXAMPLE 5

Elixir

An elixir is prepared containing the following per liter:

| | Grams |
|---|---|
| Active-AMCHA isomer, 95% pure | 105 |
| Sorbitol, 70% aqueous solution | 100 |
| Citric acid | 2 |
| Sorbic acid | 0.5 |
| Sodium cyclamate | 5 |
| Orange flavor | 4 |
| Water to make 1000 ml. | |

The above respective quantities of active-AMCHA isomer, citric acid, sorbic acid, and sodium cyclamate are dissolved in warm, de-ionized water. The sorbitol solution is admixed, and after cooling then the flavor is added. Finally, the volume is made up with water to 1000 ml., containing practically 0.1 gram of active-AMCHA per ml.

EXAMPLE 6

Tablets

Tablets containing 500 milligrams (i.e. mg.) of active-AMCHA isomer each are prepared from the following:

| | Grams |
|---|---|
| Active-AMCHA isomer | 500 |
| Wheat starch | 324 |
| Gelatine | 22 |
| Magnesium stearate | 24 |

The 500 grams of active-AMCHA are mixed with 260 grams of wheat starch and moistened with 200 ml. of water containing the gelatine. The mixture is granulated by passing it through a No. 8 mesh screen, and then dried at 40° C. for 24 hours. The dried granulation then is passed through a No. 16 mesh screen, mixed with the magnesium stearate and the remaining wheat starch, and pressed into tablets weighing 870 mg. (concave punch, diameter 13.5 mm).

EXAMPLE 7

Capsules

A mixture is prepared containing equal parts by weight of active-AMCHA isomer and lactose. This mixture then is filled, 500 mg. per capsule, into standard clear gelatine capsules; and after closing, the capsules preferably are dusted with talc or corn starch. The resulting capsules contain per dosage unit 250 mg. of the active-AMCHA isomer.

Instead of the lactose, any other compatible therapeutically acceptable diluent applicable in capsule mixes can be substituted. Alternatively, the diluent may be omitted, thus:

EXAMPLE 8

Capsules (without diluent)

Active-AMCHA isomer, after screening, is filled into clear, standard gelatine capsules, holding 500 mg. per capsule. After closing the capsules are dusted with corn starch.

The different dosage forms of the pharmaceutical preparations of the invention need not be limited to those illustrated by Examples 4 through 8 above. Likewise, neither their specific content of active-AMCHA isomer nor their qualitative composition need be restricted to those respectively specifically recited in those examples.

Instead the qualitative compositions of each specific dosage form as to the ingredients other than the active-AMCHA isomer can be varied by replacing any of them by any other or others equivalent for the respectively same purpose, or by addition of any other or others for additional needs, so long as all are compatible within the ultimate composition and are not contraindicated for the use herein required of the preparation and the particular route of administration of the particulate dosage form.

In addition, the content of active-AMCHA can be varied so as to provide it in the individual dosage units within the range of from about 100 to about 1,000 milligrams per dosage unit. The specific amount within that range per dosage unit of any of the applicable dosage forms then can be selected in accordance with the necessary dosage regimen for the specific ailment stemming from increased fibrinolysis, which is to be treated.

Thus, the pharmaceutical preparations of the invention comprise a therapeutically acceptable dosage form having incorporated therein an antifibrinolytically active agent consisting essentially of active-AMCHA within the range of from about 100 to about 1,000 milligrams per individual dosage unit.

Within the invention there is the method of combating an ailment which results from increased fibrinolysis, which method comprises administering to a subject suffering from such ailment an antifibrinolytically effective dosage of a pharmaceutically useful preparation as described in the preceding paragraph at a dosage regimen sufficient to overcome said ailment within the time indicated by its type and intensity.

While the invention has been explained in relation to certain illustrative embodiments of it, it is understood that many modifications and substitutions may be made in any of the specific embodiments within the scope of the appended claims which are intended also to cover equivalents of them.

We claim:

1. The method of preparing the 4-aminomethyl-cyclohexane carboxylic acid isomer which in substantially pure state assays at least about 90 percent antifibrinolytically active material, which method comprises reacting the 4-aminomethyl-cyclohexane methanol isomer melting at 118° C., in an inert solvent for it and the presence of sufficient alkali metal carbonate to neutralize later formed hydrogen halide, with sufficient benzoyl halide dissolved in an inert solvent for it, and while cooling, to benzoylate its amino group, heating the reaction mixture until substantially complete benzoylation of said group occurs; recovering the resulting 4-benzoylaminomethyl-cyclohexane methanol and admixing it with water and sufficient alkali metal hydroxide to provide oxidizing conditions, adding sufficient of a compatible oxidizing agent to oxidize the methanol group to the carboxylic acid group while controlling the temperature below about 40° C. until substantial completion of the oxidation; removing the resulting 4-benzoylaminomethyl-cyclohexane carboxylic acid from the reaction mixture, heating it with sufficient mineral acid to split off the benzoyl group; and separating the resulting 4-aminomethyl-cyclohexane carboxylic acid antifibrinolytically active isomer.

2. The method of preparing the 4-aminomethyl-cyclohexane carboxylic acid isomer which in substantially pure state assays at least about 90 percent antifibrinolytically active material, which method comprises reacting the isomer of 1,4-dimethyl-cyclohexane dicarboxylate melting at 69°–71° C., dissolved in a water-miscible lower alkanol solvent for it, with sufficient of an aqueous solution of an alkali metal hydroxide to hydrolyze said diester to the corresponding mono-ester and while cooling at a rate to avoid undesirable temperature rise; heating the resulting reaction mixture until conversion to the mono-ester is substantially completed; cooling and neutralizing the reaction mixture with mineral acid thereby precipitating the mono-ester; reacting the latter with sufficient thionyl halide to provide the corresponding acid halide of said half-ester heating their mixture until sufficiently complete formation of the corresponding cyclohexane methyl half-ester acid halide results; evaporating off any unreacted thionyl halide and distilling from the residue the cyclohexane methyl half-ester acid halide; reacting the latter half-ester acid halide under conditions to maintain the temperature below about 10° C. with concentrated ammonia to convert said half-ester acid halide to the corresponding ester amide; allowing the reaction mixture to stand while cold for the corresponding cyclohexane methyl half-ester amide to precipitate out; separating said precipitated half-ester and heating it in an inert solvent with thionyl halide until said half-ester amide is converted to methyl 4-cyano-cyclohexane carboxylate, filtering off any insoluble material in the reaction mixture and evaporating off the solvent from the clear filtrate reaction mixture, and distilling off from the residue the methyl 4-cyano-cyclohexane carboxylate; reacting the latter dissolved in a water-miscible lower alkanol solvent for it under ester-hydrolyzing conditions with an aqueous solution of an alkali metal hydroxide to hydrolyze said ester to 4-cyano-cyclohexane carboxylic acid; separating the latter from the reaction mixture and dissolving said carboxylic acid in sufficient of a water-soluble alkaline agent suitable for use in catalytic reduction, and feeding in hydrogen gas in the presence of sufficient of a compatible reduction catalyst until the desired reduction is substantially complete; thereafter separating the insoluble material from the reaction solution and concentrating said solution to recover from it said 4-aminomethyl-cyclohexane carboxylic acid end product.

3. The method as claimed in claim 2, wherein the reduction catalyst is Raney nickel.

4. The method of preparing the 4-aminomethyl-cyclohexane carboxylic acid isomer which in substantially pure state assays at least about 90 percent antifibrinolytically active material, which method comprises adding to a cold reaction mixture of 4-aminomethyl-cyclohexane methanol and sufficient alkali metal carbonate to neutralize the later formed hydrogen halide, in an inert solvent for said cyclohexane methanol, sufficient benzoyl halide to form the corresponding benzoylaminomethyl derivative, the benzoyl halide being added in a suitable inert solvent advantageously miscible with said first solvent and cautiously while cooling the reaction mixture to avoid undesirable temperature rise; then heating said mixture until substantially complete formation of said benzoyl-derivative occurs; removing any insoluble material from the reaction solution and distilling off the solvents, from their residue recovering the resulting 4-benzoylaminomethyl-cyclohexane methanol; admixing the latter with water and sufficient alkali metal hydroxide to provide oxidation conditions and to the resulting mixture adding a compatible oxidizing agent to oxidize the methanol group to the carboxylic group while controlling the temperature advantageously below about 40° C. until addition of said agent is completed, and then beneficially with agitation until substantial completion of the oxidation; removing any insoluble material from the reaction mixture and acidifying it with mineral acid and cooling it; removing the separated oily layer of 4-benzoylaminomethyl-cyclohexane carboxylic acid and heating it with sufficient mineral acid to split off the benzoyl group; then concentrating the resulting mixture to about the original volume of said oily intermediate, and removing any insoluble material therefrom; thereafter evaporating the filtrate to dryness, dissolving it in distilled water and passing it through a bed of chromatography resin; evaporating the filtrate therefrom to about concentrated state and adding sufficient acetone to precipitate the said antifibrinolytically active 4-aminomethyl-cyclohexane carboxylic acid isomer.

* * * * *